United States Patent
Inaba

(10) Patent No.: US 8,336,685 B2
(45) Date of Patent: Dec. 25, 2012

(54) DAMPER

(75) Inventor: Aiko Inaba, Yokohama (JP)

(73) Assignee: Nifco Inc., Yokohama-Shi (JP)

( * ) Notice: Subject to any disclaimer, the term of this patent is extended or adjusted under 35 U.S.C. 154(b) by 357 days.

(21) Appl. No.: 12/733,833

(22) PCT Filed: Oct. 22, 2008

(86) PCT No.: PCT/JP2008/069152
§ 371 (c)(1),
(2), (4) Date: Mar. 23, 2010

(87) PCT Pub. No.: WO2009/054416
PCT Pub. Date: Apr. 30, 2009

(65) Prior Publication Data
US 2010/0193306 A1    Aug. 5, 2010

(30) Foreign Application Priority Data

Oct. 23, 2007 (JP) ................................. 2007-275487

(51) Int. Cl.
*F16D 57/00* (2006.01)
(52) U.S. Cl. ......................................... 188/290; 464/24
(58) Field of Classification Search ................. 188/290, 188/292, 295, 378–380; 74/813 R; 464/24, 464/25
See application file for complete search history.

(56) References Cited

U.S. PATENT DOCUMENTS

2002/0125085 A1 *  9/2002  Oliver et al. .................. 188/290

FOREIGN PATENT DOCUMENTS

| JP | H05-240285 | 9/1993 |
| JP | H06-081877 | 3/1994 |
| JP | H09-177908 | 7/1997 |
| JP | H10-019076 | 1/1998 |
| JP | H10-246268 | 9/1998 |
| JP | 2000-199536 | 7/2000 |
| JP | 2002-339648 | 11/2002 |
| JP | 2007-085503 | 4/2007 |
| JP | 2007-155122 | 6/2007 |
| WO | WO 2006/092891 | 9/2006 |

* cited by examiner

*Primary Examiner* — Pamela Rodriguez
(74) *Attorney, Agent, or Firm* — Manabu Kanesaka

(57) ABSTRACT

A damper includes a housing, a hollow outer rotor provided inside the housing, an inner rotor disposed inside the outer rotor to constitute a plurality of liquid chambers and rotating in a state decentered relative to an axial core of the outer rotor, a communicating passage connecting between the liquid chambers, and a valve mechanism moving inside the communicating passage. Viscous fluid is filled between the outer rotor and the inner rotor. When the pressure inside the communicating passage reaches a predetermined value or above due to the rotation of the inner rotor, the communicating passage is closed or a flow passage area of they communicating passage is narrowed, and when the pressure inside the communicating passage falls to the predetermined value or less, the communicating passage is opened.

8 Claims, 8 Drawing Sheets

DAMPER

RELATED APPLICATIONS

The present application is National Phase of International Application No. PCT/JP2008/069152 filed Oct. 22, 2008, and claims priority from Japanese Application No. 2007-275487, filed Oct. 23, 2007, the disclosure of which is hereby incorporated by reference herein in its entirety.

FIELD OF THE INVENTION

This invention relates to a damper generating a torque for a rotor.

BACKGROUND OF THE ART

For a movable body such as a sliding door, drawer, and the like, there is a case of using a damper for putting a brake on the movable body, and the movable body is set so as not to move more vigorously than necessary. For example, in Japanese Patent Document 1, as for a braking force imparted for the movable body, in accordance with a rotational direction of a pressing member, a flow volume of flowing viscous liquid is varied. Also, in Japanese Patent Document 2, an auxiliary chamber is provided separately from a torque generation chamber, and in accordance with a rotational direction of a rotational axis, a leaf spring disposed between the torque generation chamber and the auxiliary chamber is opened and closed, so that the flow volume is adjusted and a torque acting on the rotational axis can be varied.

Specifically, in the above-mentioned dampers, in accordance with a moving direction of the movable body, the torque acting on the rotor can be varied.

Patent Document 1: Japanese Unexamined Patent Application Publication (TOKKAI) No. 2007-85503
Patent Document 2: Japanese Unexamined Patent Application Publication (TOKKAI) No. 2000-199536

DISCLOSURE OF THE INVENTION

Problems to be Solved by the Invention

In view of the above-mentioned facts, the present invention provides a damper which can vary the torque acting on the rotor in response to a rotational speed of the rotor.

Means for Solving the Problems

In the first embodiment of the present invention, a damper is provided, and includes a housing; a hollow outer rotor provided inside the housing; an inner rotor provided inside the outer rotor, constituting a plurality of liquid chambers wherein viscous fluid is filled between the outer rotor, and rotating in a state decentered relative to an axial core of the outer rotor; a communicating passage interconnecting the liquid chambers; and a valve mechanism moving inside the communicating passage so that if the pressure inside the communicating passage reaches a predetermined value or above due to the rotation of the inner rotor, the communicating passage is closed or a flow passage area of the communicating passage is narrowed, and if the pressure inside the communicating passage falls to the predetermined value or less, the communicating passage is opened.

In the above-mentioned embodiment, inside the housing, the hollow outer rotor is provided inside the housing, and the inner rotor rotating in the state decentered relative to the axial core of the outer rotor is disposed inside the outer rotor. The plurality of liquid chambers wherein the viscous fluid is filled is constituted between the inner rotor and the outer rotor.

By rotating the inner rotor, a viscous resistance due to the viscous fluid filled between the inner rotor and the outer rotor, is produced. Also, a shear resistance of the viscous fluid is produced due to a rotational speed difference between the inner rotor and the outer rotor. Moreover, by rotating in the state wherein the inner rotor is decentered relative to the axial core of the outer rotor, the viscous fluid is compressed at a predetermined position in a circumferential direction of the outer rotor between the inner rotor and the outer rotor. As a result, a compression resistance is produced.

Specifically, by rotating the inner rotor, the viscous resistance due to the viscous fluid, the shear resistance, and the compression resistance act on the inner rotor.

Also, the communicating passage connecting both the liquid chambers is formed in the damper, and the valve mechanism is provided in the communicating passage. The valve mechanism is movable inside the communicating passage, and if the pressure inside the communicating passage reaches the predetermined value or above due to the rotation of the inner rotor, the communicating passage is closed, and both liquid chambers become a non-communicated state, or if by narrowing the flow passage area of the communicating passage, the pressure inside the communicating passage falls to the predetermined value or less, the communicating passage opens, and both liquid chambers become a communicated state.

Specifically, if the pressure inside the communicating passage reaches the predetermined value or above, due to the valve mechanism, both liquid chambers are in the non-communicated state (including a state wherein the flow passage area is narrowed). Thereby, besides the viscous resistance due to the viscous fluid caused by the rotation of the inner rotor, the shear resistance, and the compression resistance, the compression resistance caused by compressing the viscous fluid inside the liquid chambers, is added, and the torque acting on the inner rotor increases, so that a damping force increases.

Net, if the pressure inside the communicating passage falls to the predetermined value or less, due to the valve mechanism, both liquid chambers are in the communicated state. Thereby, in the liquid chambers, compared to the case wherein both liquid chambers are in the non-communicated state, the compression resistance caused by compressing the viscous fluid inside the liquid chambers is reduced, the torque acting on the inner rotor descends, and the damping force decreases.

Specifically, according to the above-mentioned embodiment, in accordance with the rotational speed of the inner rotor, the torque acting on the inner rotor can be varied.

Incidentally, the embodiment may have a structure rotating the outer rotor by following the rotation of the inner rotor. In this case, the viscous resistance due to the viscous fluid, the shear resistance, and the compression resistance act on the outer rotor as well.

As for the second embodiment of the present invention, as in the first embodiment of the present invention, the inner rotor may include a first trochoidal tooth form, and a second trochoidal tooth form which is engageable with the first trochoidal tooth form may be formed on the inner circumferential surface of the outer rotor, so that the liquid chambers may be constituted by the first trochoidal tooth form and the second trochoidal tooth form.

In the above-mentioned structure, the inner rotor includes the first trochoidal tooth form, and the second trochoidal tooth form which is engageable with the first trochoidal tooth form is formed on the inner circumferential surface of the outer rotor, so that by moving the first trochoidal tooth form due to the rotation of the inner rotor, the outer rotor rotates via the second trochoidal tooth form.

Then, due to the viscous resistance of the viscous fluid produced on the first trochoidal tooth form and the second trochoidal tooth form; the shear resistance of the viscous fluid produced between the viscous fluid which is not stirred when a tooth portion of the first trochoidal tooth form moves, and the tooth portion; the compression resistance of the viscous fluid produced by compressing the viscous fluid inside the tooth portion of the second trochoidal tooth form in the process wherein the tooth portion of the first trochoidal tooth form engages with the tooth portion of the second trochoidal tooth form, the torque can be generated in the inner rotor.

As for the third embodiment of the present invention, as in the first embodiment of the present invention, the liquid chambers may be divided into a plurality of positive pressure side liquid chambers wherein a positive pressure is produced, and a plurality of negative pressure side liquid chambers wherein a negative pressure is produced due to a flow movement of the viscous fluid, and the positive pressure side liquid chambers and the negative pressure side liquid chambers may be connected by the communicating passage.

By rotating the inner rotor in the state decentered relative to the axial core of the outer rotor, the viscous fluid is compressed at the predetermined position in the circumferential direction of the outer rotor between the inner rotor and the outer rotor. However, assuming the predetermined position is a standard, due to the flow movement of the viscous fluid, the upstream side of the rotational direction of the inner rotor becomes the positive pressure side liquid chambers, and the downstream side of the rotational direction of the inner rotor becomes the negative pressure side liquid chambers.

In the above-mentioned structure, both liquid chambers which become the positive pressure are connected, and also both liquid chambers which become the negative pressure are connected, so that the positive pressure side liquid chambers and the negative pressure side liquid chambers are divided. The positive pressure side liquid chambers and the negative pressure side liquid chambers are connected by the communicating passage, and the valve mechanism is provided in the communicating passage. Specifically, since the valve mechanism is provided in an area wherein the pressure inside the liquid chambers varies from the positive pressure to the negative pressure, the torque adjustment becomes easier compared to the case wherein the valve mechanism is provided in a portion where the pressure minutely varies.

As for the fourth embodiment of the present invention, as in the first embodiment of the present invention, the valve mechanism may be constituted by including a valve body provided to be movable inside the communicating passage and opening and closing a communicating opening for the liquid chambers; and an urging mechanism urging the valve body in a direction opening the communicating opening.

In the above-mentioned structure, the valve body is provided inside the communicating passage and movable inside the communicating passage, and opens and closes the communicating opening for the liquid chambers. Then, due to the urging mechanism, the valve body is urged in the direction opening the communicating opening.

Specifically, an usual communicating opening is in an opened state, and the positive pressure side liquid chambers and the negative pressure side liquid chambers are in the communicated state. However, for example, if the rotational speed of the inner rotor reaches the predetermined value or above, the viscous resistance of the viscous fluid passing inside the communicating passage is increased, and the communicating opening receives a high pressure from the viscous fluid, so that the valve body is pressed in the direction against the urging force of the urging mechanism, and closes the communicating opening, so that the positive pressure side liquid chambers and the negative pressure side liquid chambers become the non-communicated state (including the state wherein the flow passage area is narrowed). Thus, since the torque switching is carried out only by the urging force due to the urging mechanism, the switching speed is stabilized.

As for the fifth embodiment of the present invention, as in the fourth embodiment of the present invention, the valve body is a piston formed in an approximately cup shape, and an orifice may be formed on the bottom part of the piston.

In the above-mentioned structure, the valve body is the piston formed in the approximately cup shape, and the orifice is formed on the bottom part of the piston. Since the portion except for the orifice has a sealing surface, even if the valve body receives the high pressure from the viscous fluid, the valve body receives a pressing force due to the viscous fluid by the sealing surface, so that the piston is difficult to be damaged.

As for the sixth embodiment of the present invention, in the fifth embodiment of the present invention, the urging mechanism may be provided inside the piston.

In the above-mentioned structure, by providing the urging mechanism inside the piston, a secure sealing characteristic of the piston can be obtained due to downsizing of the valve mechanism and postural stability of the urging mechanism.

As for the seventh embodiment of the present invention, in the fifth embodiment of the present invention, the piston may be respectively provided in the communicating passage of the positive pressure side liquid chambers side and the communicating passage of the negative pressure side liquid chambers side.

In the above-mentioned structure, in the case wherein the inner rotor is normally rotated, or reversely rotated, the piston of the communicating passage of the positive pressure side liquid chambers side or the piston of the communicating passage of the negative pressure side liquid chambers side can respectively move, so that despite the rotational direction of the inner rotor, the torque can be produced in the inner rotor.

Effects of the Invention

Due to the above-mentioned structure, the present invention can vary the torque acting on the rotor corresponding to the rotational speed of the rotor.

BEST MODE FOR CARRYING OUT THE INVENTION

Next, a damper according to embodiments of the present invention will be explained.

First Embodiment

Figure 1:
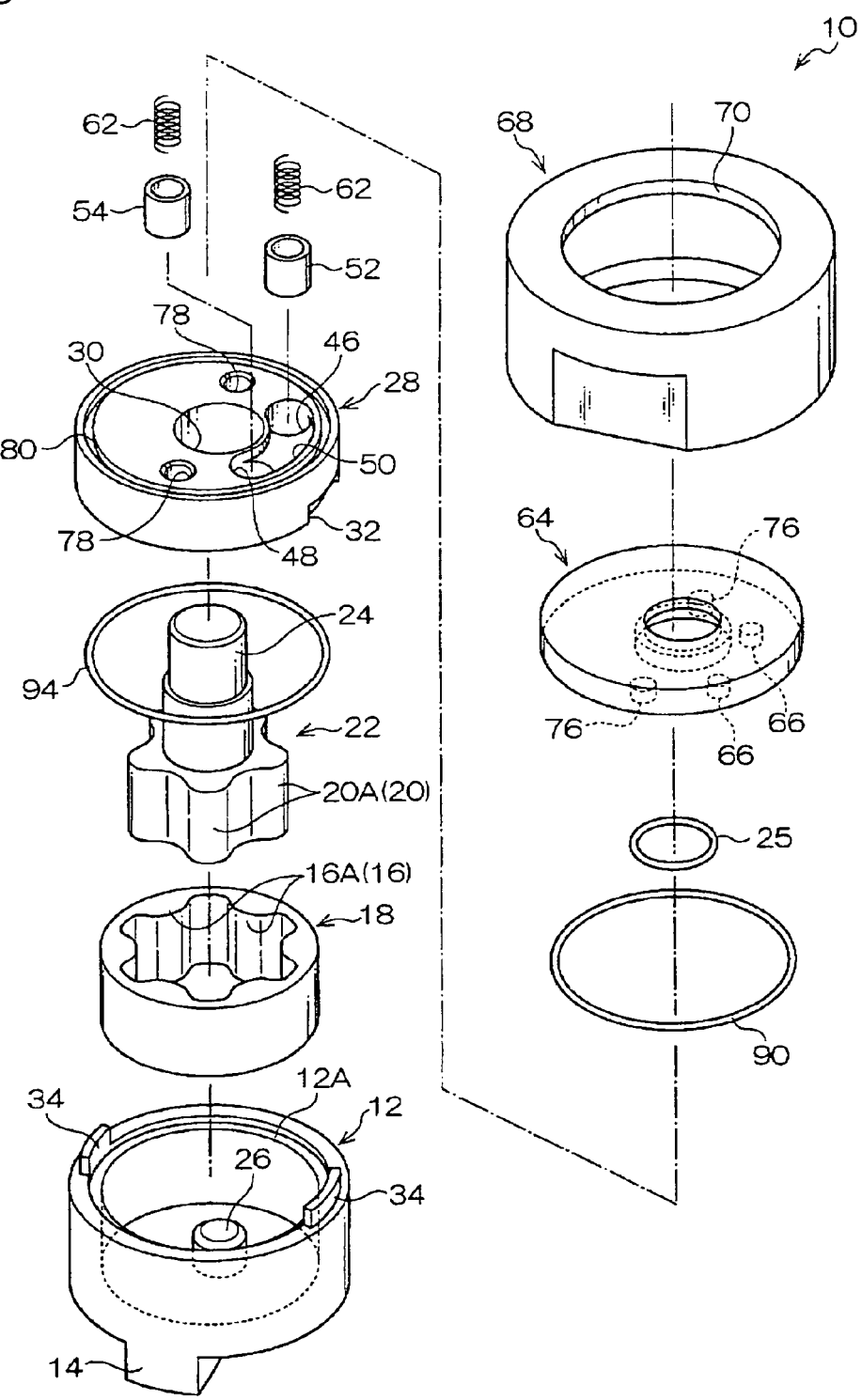
FIG. 1 is an exploded perspective view showing a damper according to the first embodiment of the present invention.

As shown in FIG. 1, a damper 10 includes a housing 12 with a bottom formed in an approximately cylindrical shape. Here, for the sake of convenience of the explanation, each component will be explained by making an opening side of the housing 12 as an upper side and a bottom side as a lower side of the damper 10.

From a lower surface portion of the housing 12, a projection 14 projects along a diametrical direction of the housing 12, and is fittable to a fixed portion of one of relatively movable members in a rotationally locked state. Also, on the inside of the housing 12, an outer rotor 18 formed in the approximately cylindrical shape and forming trochoidal tooth form portions (second trochoidal tooth forms) 16 including a plurality of tooth portions 16A (here, six portions) on the inside, is provided. The outer rotor 18 is rotatable along a circumferential direction of the housing 12, and the height of the upper end surface of the trochoidal tooth form portions 16 is lower than that of the upper end portion of the housing 12 (see FIGS. 5A, 5B).

Also, on the inside of the trochoidal tooth form portions 16, an inner rotor 22 forming trochoidal tooth form portions (first trochoidal tooth forms) 20 including tooth portions 20A (here, five portions) which are engageable with the tooth portions 16A of the trochoidal tooth form portions 16, is provided. The height of the upper end surface of the trochoidal tooth form portions 20 is approximately the same as that of the upper end surface of the trochoidal tooth form portions 16 (see FIGS. 5A, 5B).

In the central portion of the inner rotor 22, an axial portion 24 is provided, and a rotational force is transmitted from the other of the relatively movable members. On the other hand, on the bottom surface of the housing 12, an approximately cylindrical boss 26 is formed in a position which is deviated from an axial core of the housing 12. In the boss 26, an approximately cylindrical hole portion (not shown) which is formed in the lower surface of the trochoidal tooth form portions 20 is insertable from the outside. In a state wherein the hole portion is inserted from the outside into the boss 26, the inner rotor 22 is supported by axes, and rotatable in a state decentered relative to the axial core of the housing 12 and the outer rotor 18.

Figure 2:
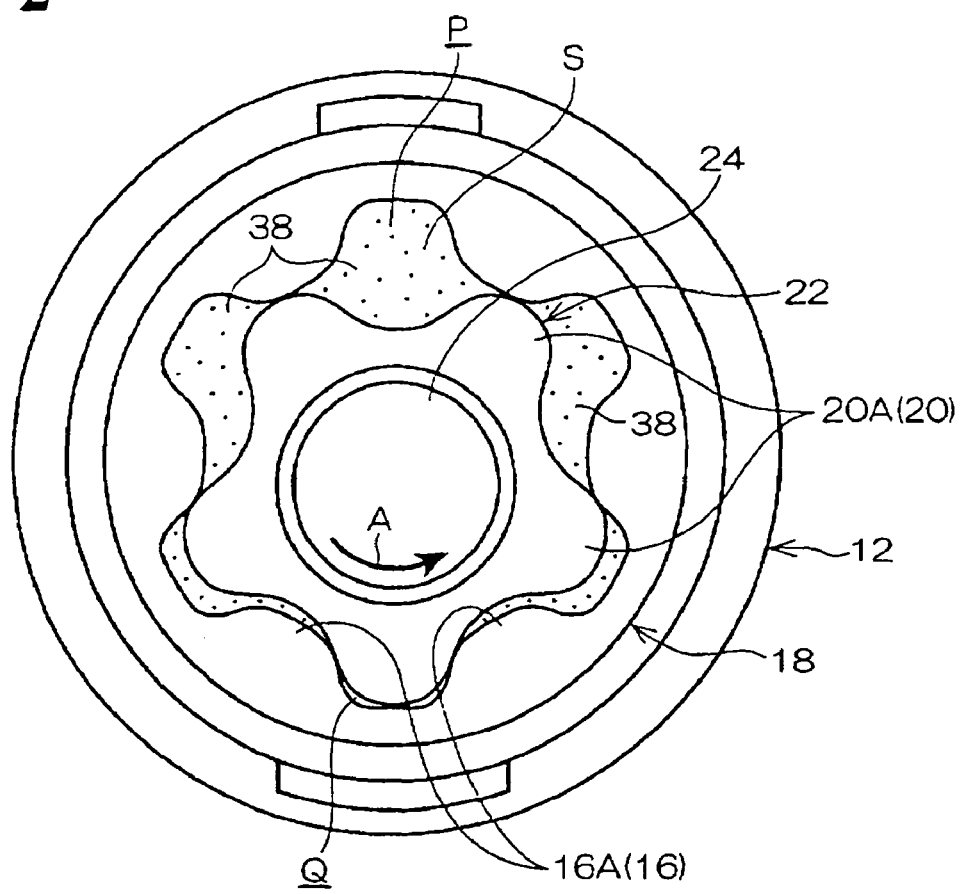
FIG. 2 is a plan view showing a relationship of an inner rotor and an outer rotor constituting the damper according to the first embodiment of the present invention.

Specifically, if the inner rotor 22 rotates at the center of the axial portion 24, as shown in FIG. 2, the tooth portions 20A of the trochoidal tooth form portions 20 of the inner rotor 22 abut against the tooth portions 16A of the trochoidal tooth form portions 16 at a predetermined position in a circumferential direction of the outer rotor 18. Accordingly, the tooth portions 16A are pressed along a rotational direction of the inner rotor 22, and the outer rotor 18 rotates.

Thus, since the inner rotor 22 rotates at the center of the axial portion 24 in a state decentered relative to the axial core of the outer rotor 18, gaps (liquid chambers) 38 formed between the trochoidal tooth form portions 20 of the inner rotor 22 and the trochoidal tooth form portions 16 of the outer rotor 18 are approximately constant in the circumferential direction of the outer rotor 18. Then, in the liquid chambers 38 provided between the inner rotor 22 and the outer rotor 18, silicon oil S (shown by dots) is filled.

Figure 5A:
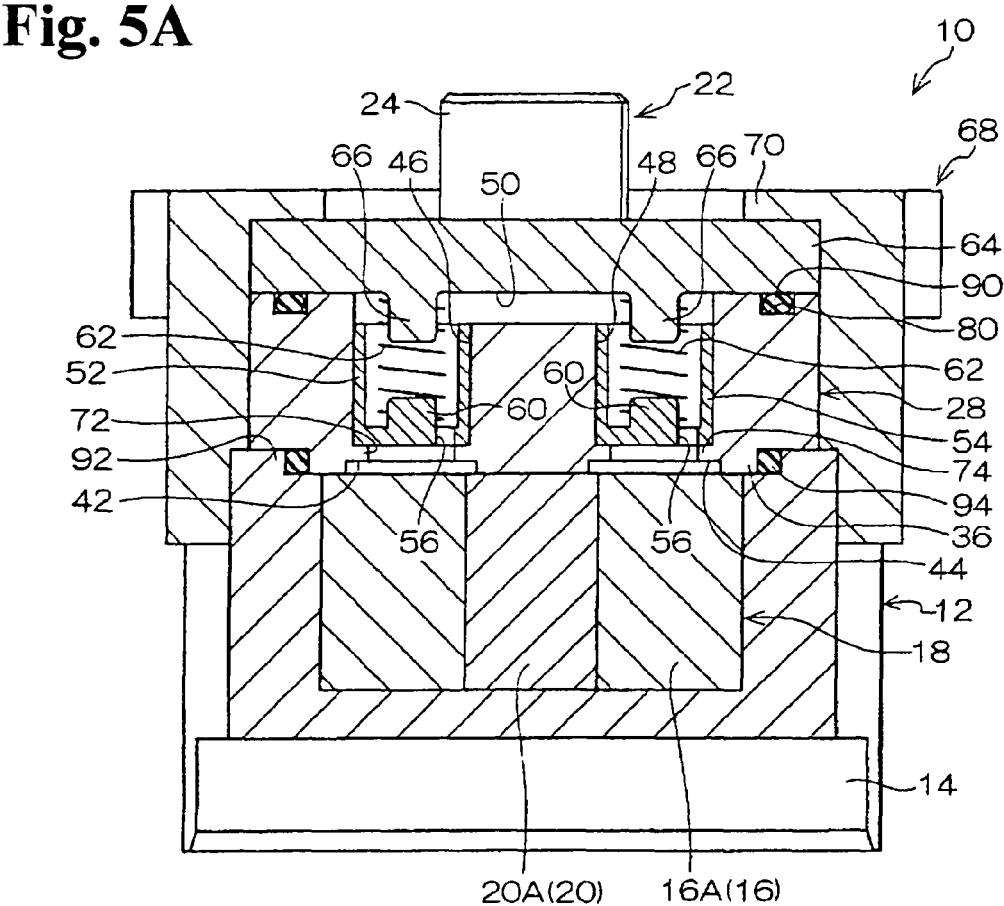
FIG. 5A is a sectional view showing a case wherein the inner rotor is rotating at a low speed, and taken along 5A-5A shown in FIG. 3.

On the other hand, as shown in FIGS. 1 and 5A, on the upper part of the housing 12, a circular plate 28 is provided. In a position misaligned from the central portion of the plate 28, a through hole 30 including the axial core which is the same as the axial core of the boss 26 of the housing 12 is formed, and the axial portion 24 of the inner rotor 22 can extend. On the outer circumferential surface of the axial portion 24, an O-ring 25 is mounted and seals the gap produced between the axial portion 24 and the through hole 30, so that the silicon oil S inside the liquid chambers 38 does not leak to the outside.

Also, the outer diameter size of the plate 28 is smaller than the outer diameter size of the housing 12, and on the lower part of the outer circumferential surface of the plate 28, a pair of engagement depressions 32 are formed in the concentric circle of the plate 28. A pair of engagement ribs 34 projected on the upper end surface of the housing 12 are engageable with the engagement depressions 32, and in a state wherein the engagement depressions 32 of the plate 28 are engaged with the engagement ribs 34 of the housing 12, the plate 28 assumes the rotationally locked state relative to the housing 12.

Figure 3:
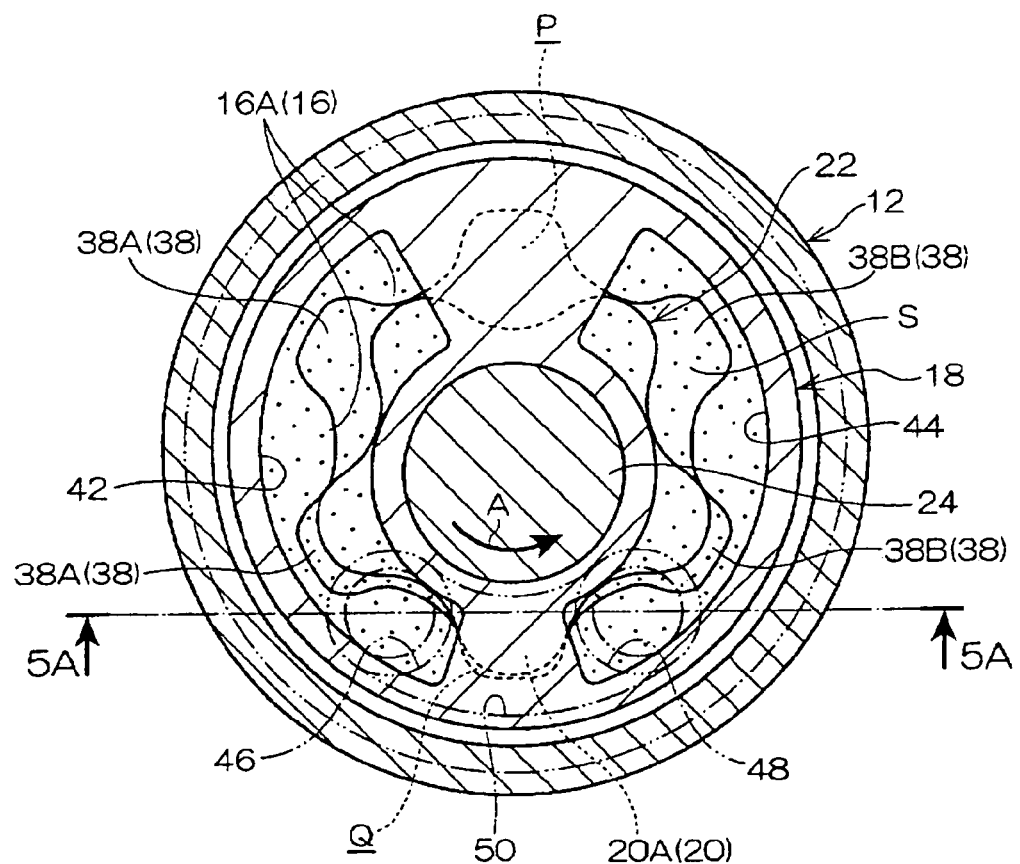
FIG. 3 is a transverse sectional view showing essential parts of the damper according to the first embodiment of the present invention.

Also, an abutting portion 36 which is abuttable against an inner border wall 12A (see FIG. 1) of the housing 12 is projected from the lower surface of the plate 28. As shown in FIG. 3, a pair of approximately fan-like communicating passages 42, 44 are depressed in the abutting portion 36 corresponding to the upper part of the liquid chambers 38.

Due to the communicating passages 42, 44, gaps are provided between the upper end surface of the trochoidal tooth form portions 20 of the inner rotor 22 and the plate 28, and between the upper end surface of the trochoidal tooth form portions 16 of the outer rotor 18 and the plate 28. Here, the communicating passages 42, 44 respectively connect both abutting liquid chambers 38 except for a maximal area P and a minimal area Q in the area of the liquid chambers 38 formed between the trochoidal tooth form portions 20 of the inner rotor 22 and the trochoidal tooth form portions 16 of the outer rotor 18. Then, the liquid chambers mutually connected by the communicating passage 42 are liquid chambers (positive pressure side liquid chambers) 38A, and the liquid chambers mutually connected by the communicating passage 44 are liquid chambers (negative pressure side liquid chambers) 38B.

Figure 4:
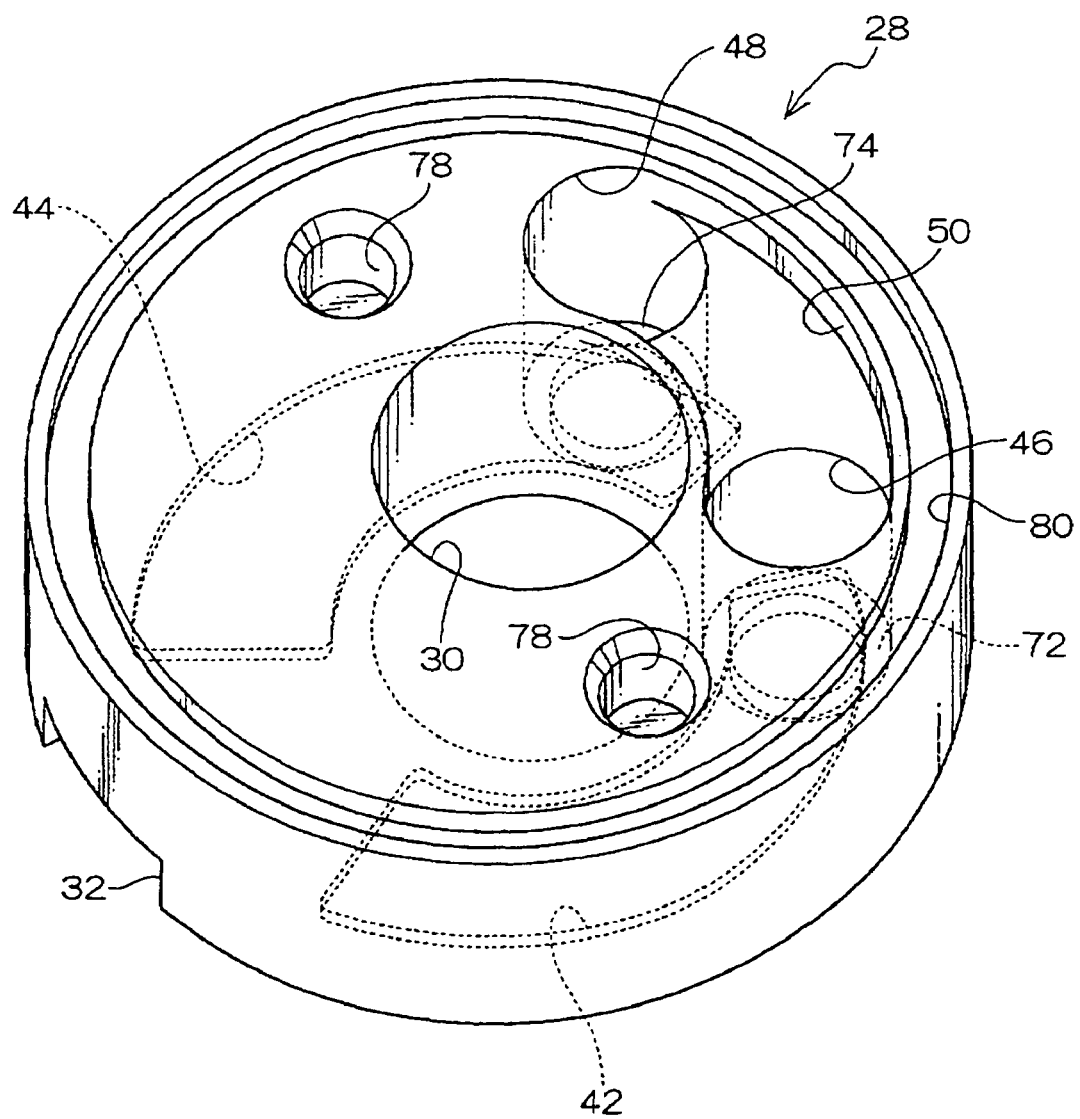
FIG. 4 is a perspective view showing a part of the essential parts of the damper according to the first embodiment of the present invention.

Also, at end portions of the communicating passages 42, 44 positioned on a minimal area Q side, communicating openings 46, 48 penetrating the plate 28 are formed. As shown in FIG. 4, on upper surfaces of the communicating openings 46, 48, a circular groove 50 is formed in a position which is one step lower than the upper surface of the plate 28, and connects the communicating opening 46 and the communicating opening 48.

As shown in FIGS. 1 and 5A, cup-shaped pistons 52, 54 are respectively inserted into the communicating openings 46, 48 with a bottom part down. The outer diameter size of the pistons 52, 54 is slightly smaller than the inner diameter size of the communicating openings 46, 48, and the pistons 52, 54 are movable along an axial direction of the communicating openings 46, 48. Also, on the bottom part of the pistons 52, 54, small-hole orifices 56, 56 are respectively formed, and allow the upper part and the lower part of the pistons 52, 54 to communicate.

Moreover, in the center of the bottom part of the pistons 52, 54, mounting portions 60 are projected, so that one end portions of coil springs 62 are mountable. On the other hand, on the upper part of the plate 28, a disk-like cap 64 is disposed. On the lower surface of the cap 64, mounting portions are projected in positions corresponding to the mounting portions 60 of the pistons 52, 54 inside the communicating openings 46, 48, so that the other end portions of the coil springs 62 are mountable.

On the upper part of the cap 64, an approximately cylinder-like cover 68 is provided, and from the upper end portion of the cover 68, a guard portion 70 juts toward the inside along a radial direction of the cover 68. The guard portion 70 abuts against the upper surface of the cap 64, and retains the cap 64.

Figure 5B:
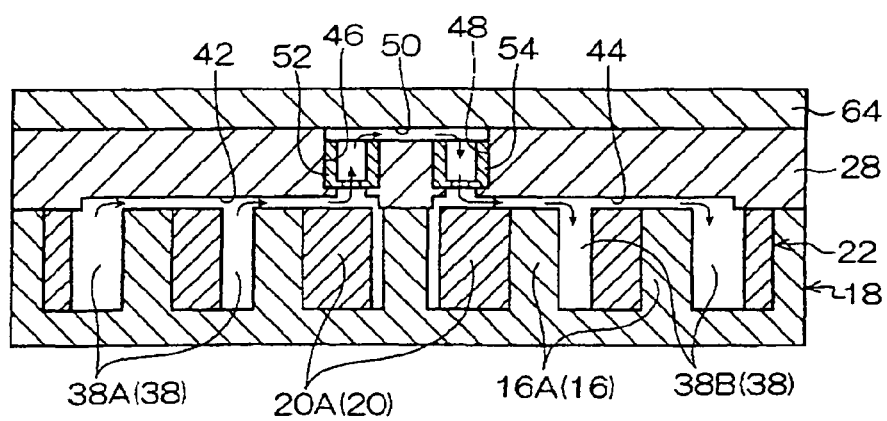
FIG. 5B is a development view of FIG. 5A.

Thereby, the piston 52 is urged in a direction positioned away from the cap 64 by the coil spring 62, abuts against stoppers 72, 74 respectively formed on communicating passages 42, 44 sides of the communicating openings 46, 48 of the plate 28 with a diameter smaller than that of the communicating openings 46, 48, so that the movement of the piston 52 is restricted. In this state, as shown in FIGS. 5A, 5B, the communicating opening 46 and the communicating opening 48 are in the state communicated via the circular groove 50, and the communicating passage 42 and the communicating passage 44 are communicated via the communicating opening 46, the circular groove 50, and the communicating opening 48.

As shown in FIGS. 2, 3, in the minimal area Q of the liquid chambers 38, a compression resistance due to the silicon oil S compressed between the trochoidal tooth form portions 20 and the trochoidal tooth form portions 16 is maximized, and due to the rotation of the inner rotor 22, the silicon oil S pushed aside by the trochoidal tooth form portions 20 is guided to the communicating opening 48 and the communicating passage 44 through the communicating passage 42 and the communicating opening 46.

In the rotation of an arrow A direction of the inner rotor 22, the silicon oil S flowing in the communicating opening 46 through the communicating passage 42 is poured out from the communicating opening 46, and via the circular groove 50, the silicon oil S is sucked on a communicating opening 48 side. Specifically, due to the flowing movement of the silicon oil S, on an upper stream side of the rotational direction of the inner rotor 22, a communicating passage 42 side becomes a positive pressure area (positive pressure side liquid chambers), and on an lower stream side of the rotational direction of the inner rotor 22, a communicating passage 44 side becomes a negative pressure area (negative pressure side liquid chambers).

Figure 6A:
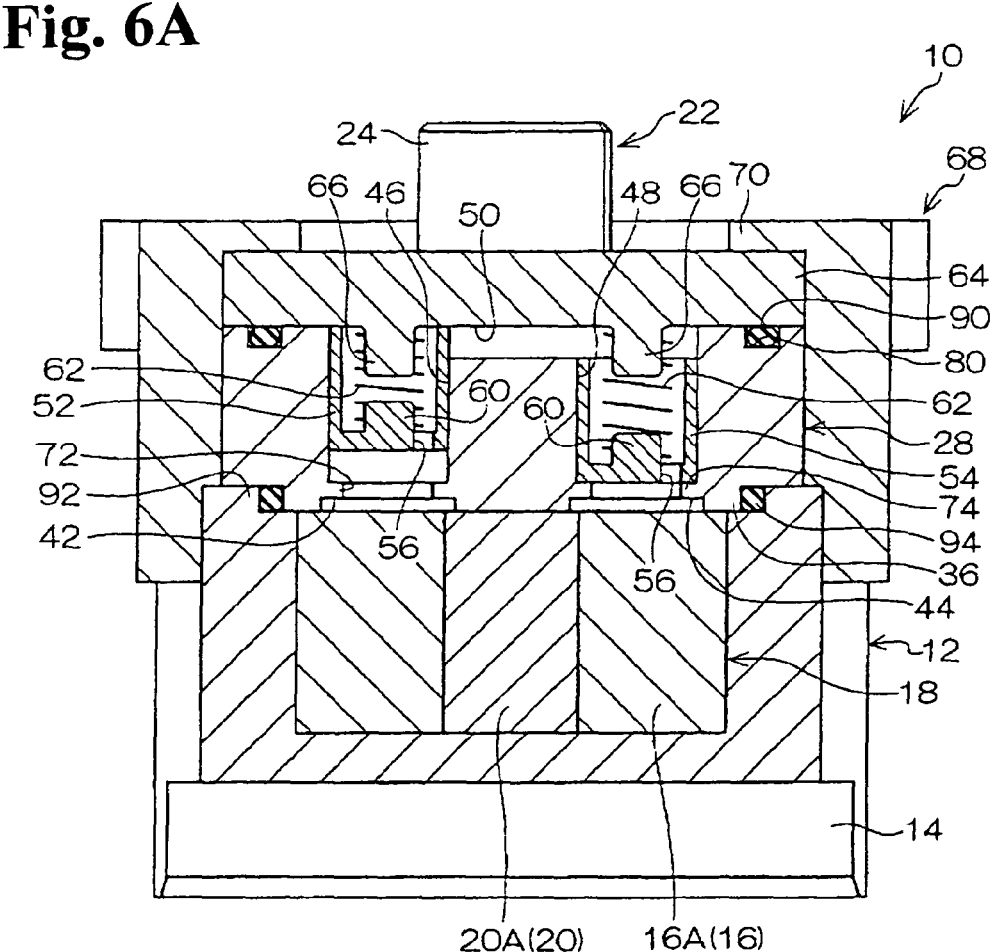
FIG. 6A is a sectional view showing a case wherein the inner rotor is rotating at a high speed, and taken along line 5-5 shown in FIG. 3.
Figure 6B:
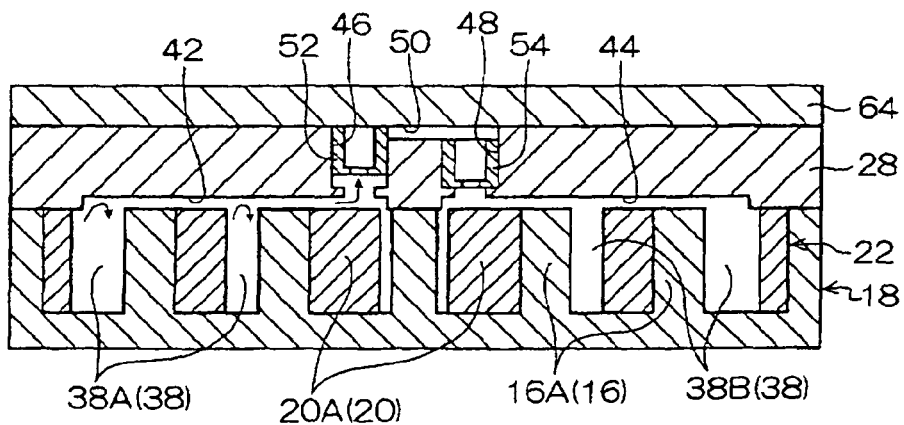
FIG. 6B is a development view of FIG. 6A.

In this state, if the pressure due to the silicon oil S traveling from the communicating passage 42 to the communicating passage 44 increases, as shown in FIGS. 6A, 6B, the piston 52 is pressed toward a direction against an urging force of the coil spring (urging mechanism) 62, moves inside the communicating opening 46, and abuts against the cap 64. In this state, by the piston 52, the circular groove 50 is divided. Specifically, the communicating opening 46 and the communicating opening 48 are divided, so that the communicating passage 42 and the communicating passage 44 become a non-communicated state.

On the other hand, on the lower surface of the cap 64, positioning bosses 76 are projected and engageable with approximately cylinder-shaped positioning holes 78 formed on the upper surface of the plate 28, and the cap 64 is locked with rotation through the plate 28 which is locked with rotation relative to the housing 12.

Here, on the upper surface of the plate 28, a circular groove portion 80 is formed on the outer circumferential border side of the plate 28, and inside the groove portion 80, an O-ring 90 is mounted. The lower surface of the cap 64 abuts against the upper surface of the plate 28, and seals the gap between the plate 28 and the cap 64 which is produced due to the O-ring 90, so that the silicon oil S inside the plate 28 does not leak into the outside.

Also, on an inner circumferential side of the upper end surface of the housing 12, a step portion 92 is provided. The height of the step portion 92 is approximately the same as the upper end surface of the trochoidal tooth form portions 16 of the outer rotor 18, and a step difference is approximately the same as a projecting volume of the abutting portion 36. An O-ring 94 is mounted in the step portion 92, and seals the gap produced between the housing 12 and the plate 28, so that the silicon oil S inside the housing 12 does not leak into the outside.

Next, the operation of the damper according to the embodiment of the present invention will be explained.

By rotating the inner rotor 22 shown in FIG. 2, a viscous resistance due to the silicon oil S filled between the trochoidal tooth form portions 20 of the inner rotor 22 and the trochoidal tooth form portions 16 of the outer rotor 18, acts. Also, a shear resistance of the silicon oil S acts due to a rotational speed difference between the inner rotor 22 and the outer rotor 18. Moreover, the silicon oil S is compressed between the trochoidal tooth form portions 20 of the inner rotor 22 and the trochoidal tooth form portions 16 of the outer rotor 18. As a result, the compression resistance acts.

Specifically, by rotating the inner rotor 22, the viscous resistance, the shear resistance, and the compression resistance due to the silicon oil S, act on the inner rotor 22.

Also, as shown in FIGS. 3, 5A, 5B, the communicating passage 42 connecting both abutting liquid chambers 38A and the communicating passage 44 connecting both abutting liquid chambers 38B, are respectively provided. In the end portions of the communicating passages 42, 44, the communicating openings 46, 48 are respectively formed, and the pistons 52, 54 are provided inside the communicating openings 46, 48. The pistons 52, 54 are urged in a direction positioned away from the cap 64 by the coil springs 62, and through the circular groove 50, the communicating opening 46 and the communicating opening 48 are communicated.

In a case wherein the inner rotor 22 is rotated in the arrow A direction, as shown in FIGS. 5A, 5B, the silicon oil S flowing inside the liquid chambers 38 formed between the trochoidal tooth form portions 20 of the inner rotor 22 and the trochoidal tooth form portions 16 of the outer rotor 18, is pushed aside by the trochoidal tooth form portions 20 in the minimal area Q (see FIG. 3) of the liquid chambers 38, before reaching the minimal area Q, and through the communicating passage 42, the silicon oil S is guided to the communicating opening 46. Since the orifice 56 is formed in the piston 52 disposed inside the communicating opening 46, through the orifice 56, the silicon oil S moves from the lower part to the upper part of the communicating opening 46.

Then, when the pressure inside the communicating opening 46 is a predetermined value or less, the silicon oil S is guided to the communicating opening 48 via the circular groove 50 from the communicating opening 46, and through the orifice 58 formed in the piston 54 inside the communicating opening 48, the silicon oil S moves from the upper part to the lower part of the communicating opening 48, and is guided to the communicating passage 44, and to the liquid chambers 38B. Specifically, via the communicating openings 46, 48, and the circular groove 50, the communicating passage 42 (liquid chambers 38A) and the communicating passage 44 (liquid chambers 38B) are in a communicated state.

From this state, if the pressure inside the communicating opening 46 reaches the predetermined value or above due to the silicon oil S by such that the inner rotor 22 is rotated at a high speed and the like, the pressure due to the silicon oil S traveling from the communicating passage 42 to the communicating passage 44, increases. As shown in FIGS. 6A, 6B, the piston 52 is pressed toward a direction against an urging force of the coil spring 62, and abuts against the cap 64. In this state, by the piston 52, the circular groove 50 is divided, so that the silicon oil S never flows to the circular groove 50 from the communicating opening 46. Specifically, the communicating passage 42 and the communicating passage 44 are in the non-communicated state.

Thereby, besides the viscous resistance, the shear resistance, and the compression resistance due to the silicon oil S caused by the rotation of the inner rotor 22, the compression resistance caused by compressing the silicon oil S on the liquid chambers 38A side, is added, and the torque acting on the inner rotor 22 increases, so that a damping force increases.

Then, if the pressure inside the communicating opening falls to the predetermined value or less, the piston 52 returns to the original position by a restoring force of the coil spring 62, and the communicating passage 42 and the communicating passage 44 become the communicated state. Accordingly, the compression resistance of the silicon oil S inside the liquid chambers 38A is reduced, the torque acting on the inner rotor 22 descends, and the damping force decreases.

Specifically, in the embodiment, according to the rotational speed of the inner rotor 22, the torque acting on the inner rotor 22 can be varied. Also, since torque switching is carried out by moving the pistons 52, 54 only by the urging force due to the coil springs 62, the switching speed is stabilized.

Here, in the present embodiment, the communicating passage 42 side which becomes the positive pressure area and the communicating passage 44 side which becomes the negative pressure area, are divided, the communicating passage 42 and the communicating passage 44 are connected by the communicating openings 46, 48, and the pistons 52, 54 are respectively provided in the communicating openings 46, 48. Specifically, by providing the pistons 52, 54 which are valve mechanisms in the area wherein the pressure inside the liquid chambers 38 changes from a positive pressure to a negative pressure, the torque adjustment becomes easier compared to the case wherein the pistons 52, 54 are provided in a portion (for example, a central portion along a circumferential direction of the communicating passages 42, 44) wherein the pressure minutely changes.

Also, the pistons 52, 54 are cup-shaped, and on the bottom part, the small-hole orifices 56, 58 are formed. Specifically, portions except for the orifices 56, 58 have sealing surfaces. Therefore, even if the pistons 52, 54 receive a high pressure from the silicon oil S, since the sealing surfaces receive a pressing force due to the silicon oil S, the pistons 52, 54 are difficult to be damaged.

Then, by disposing the coil springs 62 inside the pistons 52, 54, a secure sealing characteristic of the pistons 52, 54 can be obtained due to downsizing of the valve mechanisms and postural stability of the coil springs 62.

Incidentally, in the present embodiment, the communicating openings 46, 48 are respectively provided in the communicating passages 42, 44, and the cup-shaped pistons 52, 54 as the valve mechanisms are disposed inside the communicating openings 46, 48. However, the present embodiment is not limited to the above provided that the communicating passages 42, 44 can mutually be in the communicated state or the non-communicated state.

Also, if the pressure inside the communicating opening 46 reaches the predetermined value or above due to the silicon oil S, the piston 52 abuts against the cap 64, and divides the circular groove 50, and the communicating passage 42 and the communicating passage 44 become the non-communicated state. However, a notch portion (not shown in the figures) may be provided on an opening side of the piston 52, and the piston 52 may be abutted against the cap 64, or the communicating passage 42 and the communicating passage 44 may be communicated through the notch portion. In this case, a flow passage area of the communicating opening 46 is in a narrowed state.

Also, here, an example wherein the inner rotor 22 is rotated in the arrow A direction, is explained. However, a basic idea regarding the movement of the silicon oil S is the same as that in the case wherein the inner rotor 22 is rotated in a direction opposite to the arrow A direction, and in this case, the circular groove 50 is divided by the piston 54.

Moreover, in the present embodiment, the pistons 52, are respectively disposed inside the communicating openings 46, 48. However, the piston may be disposed in either one of the communicating openings. In the above-mentioned structure, in the case wherein the inner rotor 22 is rotated in the arrow A direction at the high speed, the communicating passage 42 and the communicating passage 44 become the non-communicated state due to the movement of the piston 52 on the communicating opening 46 side, so that the torque acting on the inner rotor 22 increases. However, for example, in the case wherein the piston 54 is disposed only in the communicating opening 48, since there is no piston 52 in the communicating opening 46, in the high-speed rotation of the inner rotor 22 in the arrow A direction, the communicating passage 42 and the communicating passage 44 remain the communicated state.

Specifically, in such structure, even if the inner rotor 22 is rotated at the high speed in the arrow A direction (in the direction opposite to the arrow A direction in the case wherein the piston 52 is disposed only in the communicating opening 46), the torque to the inner rotor 22 generated due to the narrowing of the flow passage area connecting the communicating passage 42 and the communicating passage 44, does not increase. Therefore, i.e., a one-way damper is structured, so that the increase of the torque to the inner rotor 22 due to the narrowing of the flow passage area becomes possible only for one way.

Second Embodiment

Next, the damper according to the second embodiment of the present invention will be explained. Incidentally, the explanation of the content which is approximately the same as that of the first embodiment will be omitted.

Figure 7A:
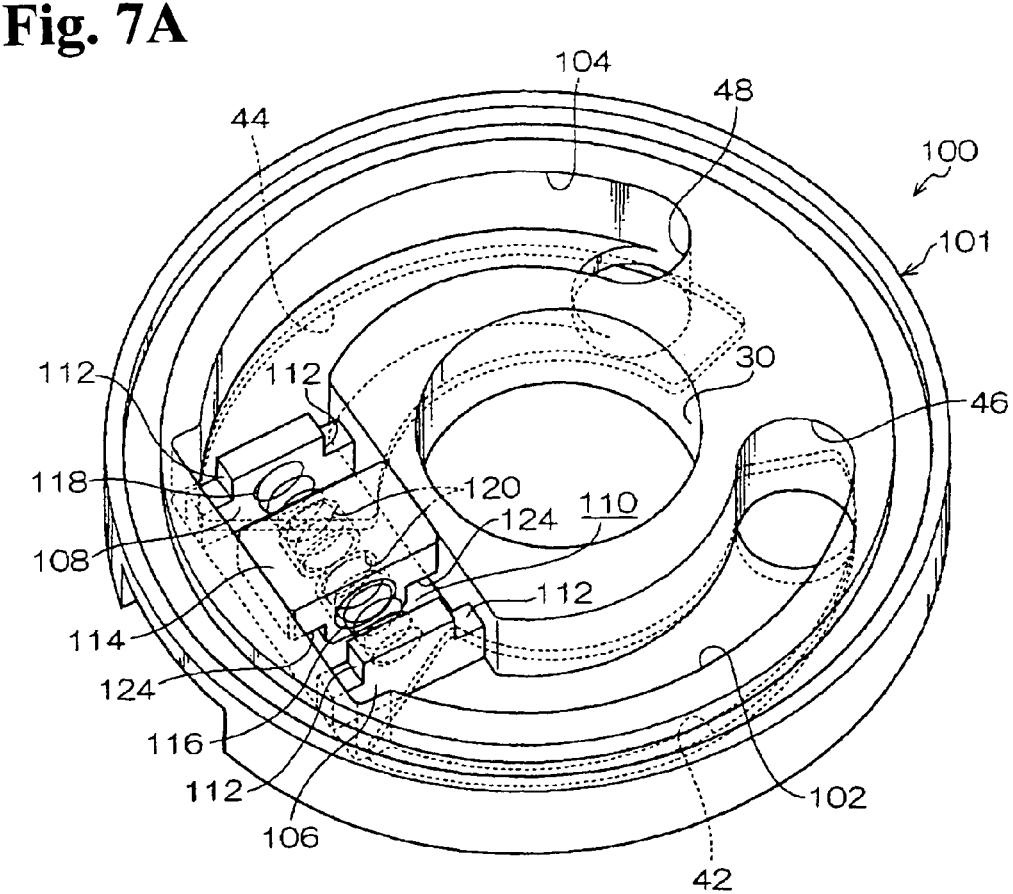
FIG. 7A is a perspective view showing the essential parts of the damper according to the second embodiment of the present invention.
Figure 7B:
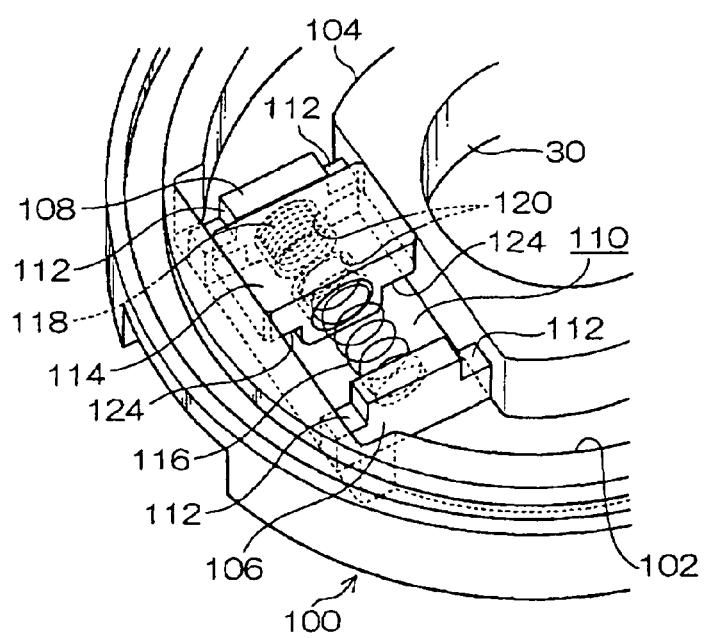
FIG. 7B is an enlarged view of FIG. 7A.

As shown in FIGS. 7A, 7B, in a damper 100, communicating passages 102, 104 are provided in positions approximately corresponding to the communicating passages 42, 44 in a plan view, and on the lower surface of a plate 101 as well as the upper surface of the plate 101. Via the communicating openings 46, 48, the communicating passages 42, 44 and the communicating passages 102, 104 are respectively communicated. In this case, the circular groove 50 (see FIG. 4) is not provided between the communicating opening 46 and the communicating opening 48.

Then, as the valve mechanisms, valve bodies 106, 108 with an area which is approximately the same as a cross-sectional area of the communicating passages 102, 104, are respectively fixed to end portions of the communicating passages 102, 104 positioned on the opposite side of the communicating openings 46, 48, and a communicating portion (communicating passage) 110 is provided between the valve body 106 and the valve body 108. Also, in upper corner portions of the valve bodies 106, 108, flow passages (communicating passages) 112 penetrating the valve bodies 106, 108, are respectively notched, and the communicating passage 102, the communicating portion 110, and the communicating passage 104 are communicated through the flow passages 112, so that the silicon oil inside the communicating passages 102, 104 can mutually flow.

On the other hand, inside the communicating portion 110, a valve member (valve body) 114 whose area is slightly narrower than the cross-sectional area of the communicating portion 110 and whose length is shorter than that of the communicating portion 110 is housed, and movable inside the communicating portion 110. In the central portion of the surface of the valve member 114 respectively facing surfaces of the valve bodies 106, 108, mounting holes 120 wherein one end portions of coil springs (urging mechanisms) 116, 118 can be respectively mounted, are provided. The other end portions of the coil springs 116, 118 can abut against the central portions of surfaces wherein the valve bodies 106, 108 are mutually faced. Due to an urging force of the coil springs 116, 118, the valve member 114 is retained in the central portion of the communicating portion 110.

Here, in the lower corner portion of the valve member 114, flow passages (communicating passages) 124 which are communicatable with the communicating passages 102, 104 through the flow passages 112, are notched. Positions of the flow passages 124 and the flow passages 112 do not overlap in a height direction.

In the case wherein the pressure due to the silicon oil is the predetermined value or less, due to the urging force of the coil springs 116, 118, the valve member 114 is retained in the central portion of the communicating portion 110. However, if the pressure due to the silicon oil reaches the predetermined value or above, the valve member 114 is pressed in a direction against the urging force of the coil springs 116, 118, and as shown in FIG. 7B, if the valve member 114 and the valve body 108 overlap, the flow passages 112 are blocked by the valve member 114, and the flow passages 124 are blocked by the valve body 108.

In the case wherein the inner rotor 22 shown in FIG. 3 is rotated, if the pressure inside the communicating portion 110 is the predetermined value or less, the silicon oil S pushed aside between the trochoidal tooth form portions 20 of the inner rotor 22 and the trochoidal tooth form portions 16 of the outer rotor 18, is guided to the communicating passage 102 through the communicating opening 46 via the communicating passage 42.

As shown in FIG. 7A, the valve body 106, the valve member 114, and the valve body 108 are positioned away from one another, so that through the flow passages 112 of the valve body 106, the silicon oil S inside the communicating passage 102 is guided into the communicating portion 110. Then, the silicon oil S guided into the communicating portion 110 is guided to the communicating passage 104 via the flow passages 124 of the valve member 114 and the flow passages 112 of the valve body 108 inside the communicating portion 110, and guided to the communicating passage 44 through the communicating opening 48.

On the other hand, if the pressure inside the communicating portion 110 reaches the predetermined value or above, the pressure due to the silicon oil S traveling from the communicating passage 102 to the communicating passage 104, increases, and the valve member 114 is pressed toward a direction against the urging force of the coil springs 116, 118, so that as shown in FIG. 7B, the valve member 114 abuts against the valve body 108. Thereby, the flow passages 112 of the valve body 108 and the flow passages 124 of the valve member 114 are blocked, and the communicating portion 110 and the communicating passage 104 assumes the non-communicated state. Accordingly, the silicon oil S guided to the communicating portion 110 is held back by the valve member 114 and the valve body 108.

Third Embodiment

Next, the damper according to the third embodiment of the present invention will be explained. Incidentally, the explanation of the content which is approximately the same as that of the first and second embodiments will be omitted.

Figure 8A:
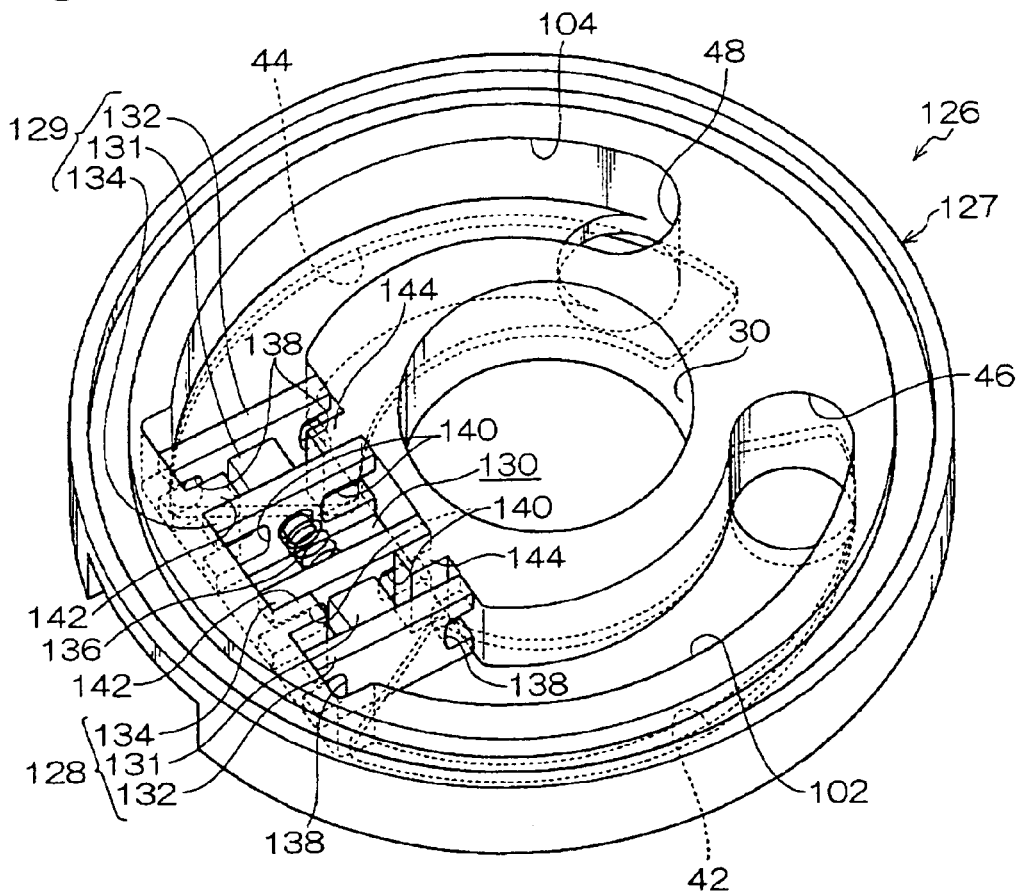
FIG. 8A is a perspective view showing the essential parts of the damper according to the third embodiment of the present invention.
Figure 8B:
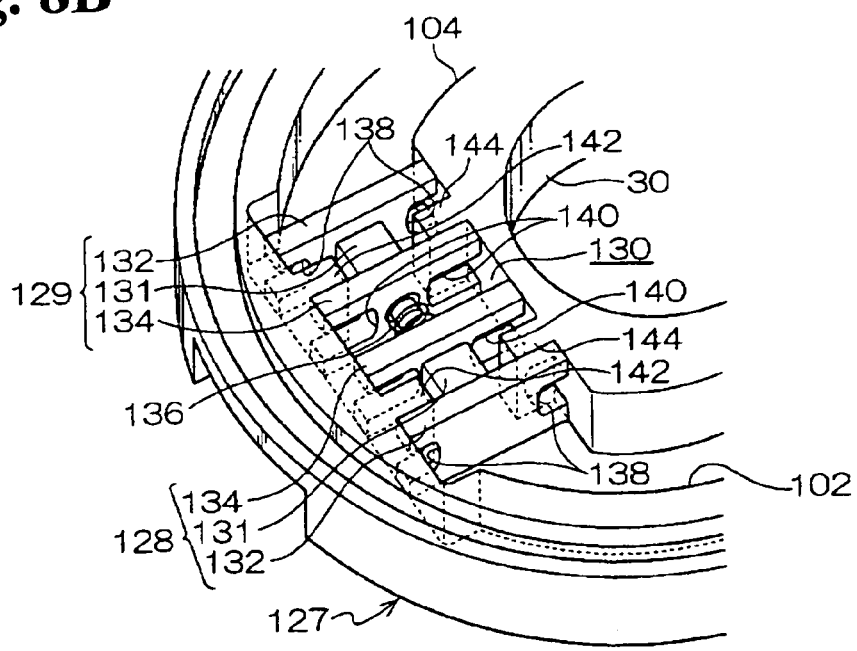
FIG. 8B is an enlarged view of FIG. 8A.

As shown in FIGS. 8A, 8B, in a damper 126 thereof, as the valve mechanisms, valve bodies 128, 129 forming an I-shape in a plan view are provided in a plate 127. Also, the communicating passages 102, 104 are communicated by a communicating portion (communicating passage) 130, and the communicating passage 102, the communicating portion 130, and the communicating passage 104 are divided by stoppers 142, 144 which are mutually facing in a state providing gaps.

Also, on both end portions of neck portions 131 positioned in central portions of the valve bodies 128, 129, plate materials 132, 134 whose areas are slightly narrower than cross-sectional areas of the communicating passages 102, 104, and the communicating portion 130, are provided. The plate materials 132 are movable inside the communicating passages 102, 104, and the plate materials 134 are movable inside the communicating portion 130. Then, a coil spring (urging mechanism) 136 is mounted between the plate material 134 and the plate material 134 which are mutually faced, and urges in a direction wherein both valve bodies 128, 129 are positioned away from each other.

Also, in the center of a height direction of both end portions of the plate materials 132, 134, flow passages (communicating passages) 138, 140 are notched, and through the flow passages 138, 140, the silicon oil S is flowable inside the flow passage 124. However, in the state wherein the plate materials 132 abut against the stoppers 142, 144, the flow passages 138 formed in both end portions of the plate materials 132 are blocked by the stoppers 142, 144.

In the case wherein the inner rotor 22 shown in FIG. 3 is rotated, when the pressure inside the communicating portion 130 is the predetermined value or less, since gaps are provided between the stoppers 142, 144 and the plate materials 138, the silicon oil S guided to the communicating passage 102 through the communicating opening 46 via the communicating passage 42, is guided into the communicating portion 130 through the flow passages 138 of the plate material 132 of the valve body 128. Then, after passing through the flow passages 140 of the plate materials 134 inside the communicating portion 130, the silicon oil S guided into the communicating portion 130 is guided to the communicating passage 104 through the flow passages 140 of the plate material 134 and the flow passages 138 of the plate material 132 of the valve body 129, and guided to the communicating passage 44 through the communicating opening 48.

On the other hand, if the pressure inside the communicating portion 130 reaches the predetermined value or above, the plate material 132 of the valve body 128 abuts against the stoppers 142, 144, and the flow passages 138 of the plate material 132 are blocked by the stoppers 142, 144, so that the communicating passage 102, the communicating portion 130, and the communicating passage 104 become the non-communicated state. Accordingly, the silicon oil S guided to the communicating passage 102 is held back by the valve body 128.

In the second embodiment and the third embodiment, since the valve mechanisms which are movable along the circumferential direction of the plate are provided, there is no need for providing the pistons 52, 54 inside the communicating openings 46, 48, so that the height for a stroke of the pistons 52, 54 becomes unnecessary. Accordingly, the height of the plate 28 can be decreased, so that the dampers 100, 126 can be downsized.

Incidentally, here, the outer rotor 18 is rotated by following the rotation of the inner rotor 22; however, the above is not required provided that the area wherein the silicon oil S is compressed is formed between the outer rotor 18 and the inner rotor 22. Specifically, provided that the inner rotor is rotatable in a state decentered relative to the outer rotor, there is no necessarily need for providing a tooth portion on the inner circumferential surface of the outer rotor and the outer circumferential surface of the inner rotor, and the inner circumferential surface of the outer rotor and the outer circumferential surface of the inner rotor may be circular.

Thus, as explained above, the damper according to the embodiments can be provided in a sliding door, wheels of a wheel chair, baby carriage, blind, lead for a pet, piano lid, suitcase, glove compartment in an automobile, cup holder series, lid of a mailbox, curtain rail, and the like besides a drawer member. If the movement speed of the movable member reaches the predetermined value or above, the damping force due to the damper increases via the rotor, so that the movement of the movable member can be decelerated.

What is claimed is:

1. A damper, comprising:
   a housing;
   a hollow outer rotor provided inside said housing;
   an inner rotor disposed inside said outer rotor, constituting a plurality of liquid chambers wherein viscous fluid is filled between the outer rotor and the inner rotor, and rotating in a state decentered relative to an axial core of the outer rotor;
   a communicating passage connecting between said liquid chambers; and
   a valve mechanism moving inside said communicating passage, said valve mechanism including a piston in an approximately cup shape having an orifice at a bottom thereof, said piston being slidably arranged inside the communicating passage and forming a sealing surface except for the orifice, and an urging device arranged inside the piston and urging said piston in a direction opening said communicating passage,
   wherein when a pressure inside the communicating passage reaches a predetermined value or above due to rotation of said inner rotor, the communicating passage is closed or a flow passage area of the communicating passage is narrowed by the piston, and when the pressure inside the communicating passage falls to the predetermined value or less, the communicating passage is opened.

2. A damper according to claim 1, wherein said inner rotor includes first trochoidal tooth forms, the outer rotor includes second trochoidal tooth forms engaging said first trochoidal tooth forms on an inner circumferential surface thereof, and said liquid chambers are constituted by said first trochoidal tooth forms and said second trochoidal tooth forms.

3. A damper according to claim 1, wherein said liquid chambers are divided into a plurality of positive pressure side liquid chambers wherein a positive pressure is produced, and a plurality of negative pressure side liquid chambers wherein a negative pressure is produced due to a flow movement of the viscous fluid, and said positive pressure side liquid chambers and said negative pressure side liquid chambers are connected by said communicating passage.

4. A damper according to claim 3, wherein said piston is provided in said communicating passage of said positive pressure side liquid chambers and the communicating passage of said negative pressure side liquid chambers.

5. A damper according to claim 1, wherein said communicating passage comprises a pair of fan shape passages spaced apart from each other, and a groove disposed away from the fan shape passages and communicating therewith, said piston being arranged between the groove and one of the fan shape passages such that the orifice is located at a side away from the groove.

6. A damper according to claim 5, wherein the piston is arranged such that when the piston receives the predetermined pressure or above, the piston is moved against the urging device by the viscous fluid from one of the fan shape passages to close the groove, and when the piston received the predetermined pressure or below, the viscous fluid passes through the orifice.

7. A damper according to claim 6, wherein two pistons, each having a spring therein, are arranged on two sides of the groove to communicate with the communicating passage.

8. A damper according to claim 7, further comprising a plate disposed above the inner and outer rotors, and having said fan shape passages, the groove on a side opposite to the fan shape passages, and two communicating openings for the pistons, connecting the groove and the fan shape passages.

* * * * *